United States Patent
Taguchi

(10) Patent No.: US 9,183,855 B2
(45) Date of Patent: Nov. 10, 2015

(54) MAGNETIC RECORDING HEAD AND DISK DEVICE WITH THE SAME

(71) Applicant: KABUSHIKI KAISHA TOSHIBA, Tokyo (JP)

(72) Inventor: Tomoko Taguchi, Kunitachi Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/332,988

(22) Filed: Jul. 16, 2014

(65) Prior Publication Data
US 2015/0228296 A1    Aug. 13, 2015

(30) Foreign Application Priority Data
Feb. 7, 2014  (JP) ................................. 2014-022279

(51) Int. Cl.
G11B 5/31      (2006.01)
G11B 5/35      (2006.01)
G11B 5/17      (2006.01)
G11B 5/11      (2006.01)

(52) U.S. Cl.
CPC .. *G11B 5/35* (2013.01); *G11B 5/11* (2013.01); *G11B 5/17* (2013.01)

(58) Field of Classification Search
CPC ...... G11B 5/1278; G11B 5/3906; G11B 5/31; G11B 5/00
USPC .................................. 360/125.3, 125.71, 128
See application file for complete search history.

(56) References Cited

U.S. PATENT DOCUMENTS

| | | | |
|---|---|---|---|
| 6,151,193 A | 11/2000 | Terunuma et al. | |
| 7,688,545 B1 | 3/2010 | Vas'Ko et al. | |
| 8,295,009 B2 * | 10/2012 | Yamada et al. | 360/125.3 |
| 8,320,079 B2 * | 11/2012 | Iwasaki et al. | 360/128 |
| 8,320,080 B1 * | 11/2012 | Braganca et al. | 360/128 |
| 8,564,904 B2 * | 10/2013 | Iwasaki et al. | 360/125.3 |
| 8,582,225 B2 | 11/2013 | Shiimoto et al. | |
| 8,810,961 B2 * | 8/2014 | Taguchi et al. | 360/123.11 |
| 2012/0262821 A1 | 10/2012 | Taguchi et al. | |
| 2013/0050875 A1 * | 2/2013 | Yamada et al. | 360/125.3 |
| 2013/0070367 A1 * | 3/2013 | Igarashi et al. | 360/75 |
| 2013/0271869 A1 * | 10/2013 | Taguchi et al. | 360/99.08 |
| 2013/0321956 A1 | 12/2013 | Shiimoto et al. | |

FOREIGN PATENT DOCUMENTS

JP    2012-104191 A    5/2012

* cited by examiner

*Primary Examiner* — Angel Castro
(74) *Attorney, Agent, or Firm* — Patterson & Sheridan, LLP

(57) ABSTRACT

A magnetic recording head includes a main magnetic pole that generates a recording magnetic field in a direction perpendicular to a recording layer, a write shield with a surface that faces a trailing side of the main magnetic pole, so that a write gap is interposed between the surface and the main magnetic pole, the write shield forming a magnetic core together with the main magnetic pole, a recording coil, a high frequency oscillator within the write gap, a wiring through which a current can flow through the main magnetic pole, the high frequency oscillator, and the write shield in series, and a magnetic element made of soft magnetic material, positioned within the write gap and separated from the high frequency oscillator, and configured to form a magnetic path passing through the main magnetic pole, the magnetic element, and the write shield, and not through the high frequency oscillator.

11 Claims, 7 Drawing Sheets

MAGNETIC RECORDING HEAD AND DISK DEVICE WITH THE SAME

CROSS-REFERENCE TO RELATED APPLICATION

This application is based upon and claims the benefit of priority from Japanese Patent Application No. 2014-022279, filed Feb. 7, 2014, the entire contents of which are incorporated herein by reference.

FIELD

Embodiments described herein relate generally to a magnetic recording head and a disk device with the same.

BACKGROUND

Recently, magnetic heads for perpendicular magnetic recording have been proposed in order to increase recording density and capacity of a magnetic disk device, or to reduce the size thereof. In this magnetic head, a recording head includes a main magnetic pole for generating a perpendicular magnetic field, a write shield magnetic pole arranged on a trailing side of the main magnetic pole with a write gap interposed therebetween, and a coil that feeds magnetic flux to the main magnetic pole. Further, a high frequency assist head has been proposed, in which a high frequency oscillator, for example, a spin torque oscillator, is disposed between a medium-side end portion of the write shield magnetic pole that faces the main magnetic pole and the main magnetic pole. In this structure, a current is fed through the main magnetic pole and the write shield magnetic pole to the high frequency oscillator.

In the high frequency assist head, a high frequency magnetic field is applied to a recording medium through oscillation of the high frequency oscillator, which easily causes a magnetization reversal in a medium recording layer, hence to improve the recording ability. This oscillation of the high frequency oscillator may be achieved while recording when a weak magnetic field is applied from a recording gap of a magnetic core to a recording medium. However, when the magnetic field applied from a recording gap of a magnetic core to a recording medium is strong, a magnetic field within the recording gap can be too strong, making favorable oscillation of the high frequency oscillator difficult to achieve.

DETAILED DESCRIPTION

Taking the above into consideration, an object of the disclosure is to provide a magnetic recording head and a disk device including the same capable of achieving stable high frequency assist and high recording density.

In general, according to one embodiment, a magnetic recording head includes a main magnetic pole that generates a recording magnetic field in a direction perpendicular to a recording layer of a recording medium, a write shield with a surface that faces a trailing side of the magnetic pole at a recording medium end of the main magnetic pole, so that a write gap is interposed between the surface and the main magnetic pole, the write shield forming a magnetic core together with the main magnetic pole, a recording coil that is wound on the magnetic core, a high frequency oscillator that is disposed between the main magnetic pole and the write shield within the write gap, a wiring through which a current can flow through the main magnetic pole, the high frequency oscillator, and the write shield in series, and a magnetic element that is made of a soft magnetic material, is positioned within the write gap and separated from the high frequency oscillator, and is configured to form a magnetic path that passes through the main magnetic pole, the magnetic element, and the write shield, and not through the high frequency oscillator.

Hereinafter, various embodiments will be described with reference to the drawings.

First Embodiment

Figure 1:
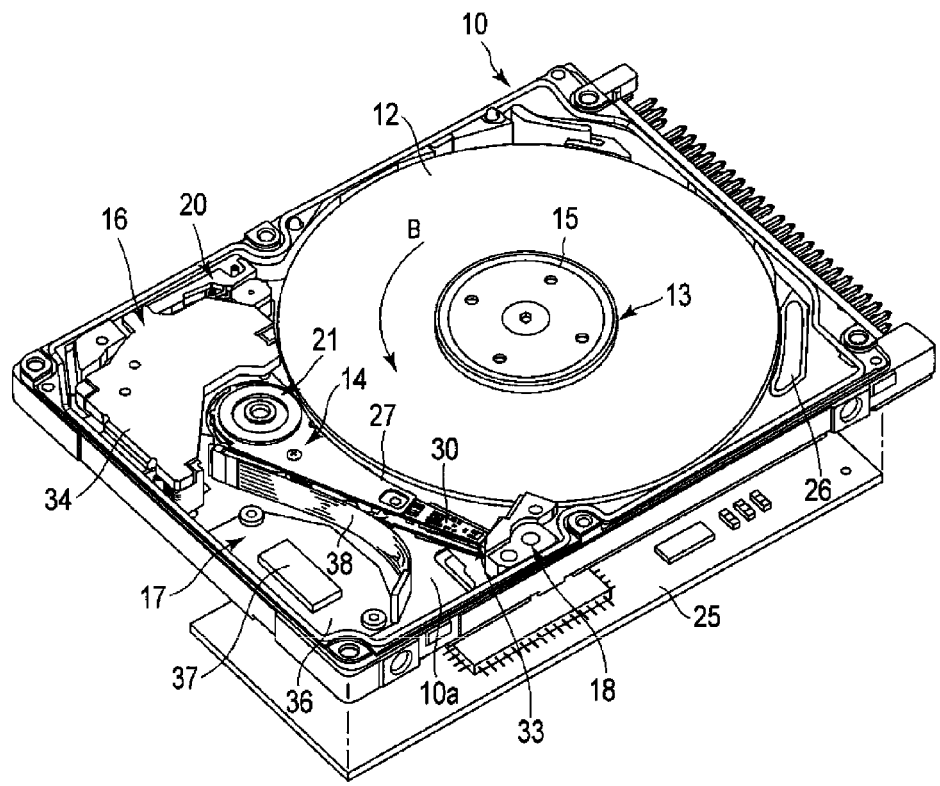
FIG. 1 is a perspective view illustrating a hard disk drive (hereinafter, referred to as an HDD) according to a first embodiment.
Figure 2:
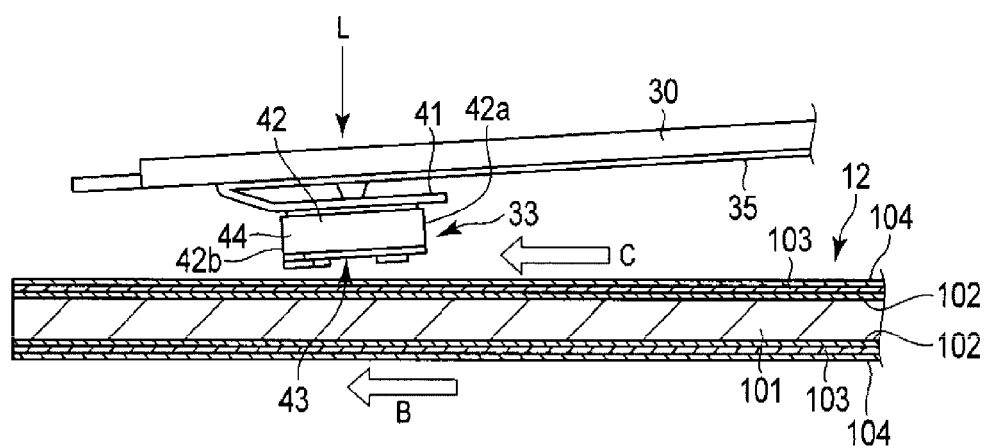
FIG. 2 is a side elevational view illustrating a magnetic head and a suspension in the HDD.

FIG. 1 illustrates an internal structure of an HDD according to a first embodiment with its top cover removed and FIG. 2 illustrates a magnetic head in a floating state. As illustrated in FIG. 1, the HDD includes a housing 10. This housing 10 includes a base 10*a* having a shape of an open-topped rectangular box and a top cover, not illustrated, in a shape of a rectangular plate. The top cover is attached to the base by a plurality of screws to close the top opening of the base. As a result, the housing 10 is kept airtight inside and may be ventilated to the outside only through a breather filter 26.

On the base 10*a*, there are provided a magnetic disk 12 as a recording medium in the form of a disk and a mechanical portion. The mechanical portion includes: a spindle motor 13 which supports and rotates the magnetic disk 12; a plurality of, for example, two magnetic heads 33 which record information to and read information from the magnetic disk 12; a head actuator 14 which movably supports the magnetic heads 33 with respect to a surface of the magnetic disk 12; and a voice coil motor (hereinafter, referred to as VCM) 16 which rotates and positions the head actuator. On the base 10a, a ramp load mechanism 18 holds the magnetic heads 33 at a position far from the magnetic disk 12 when the magnetic heads 33 are moved to the outermost periphery of the magnetic disk 12, a latch mechanism 20 holds the head actuator 14 at a retracted position when an impact or the like is applied to the HDD, and a board unit 17 on which electric components such as a conversion connector 37 and the like are mounted.

A control circuit board 25 is screwed onto an outer surface of the base 10a and positioned facing a bottom wall of the base 10a. The control circuit board 25 controls the operations of the spindle motor 13, the VCM 16, and the magnetic heads 33 through the board unit 17.

As illustrated in FIG. 1, the magnetic disk 12 is coaxially fitted on a hub of the spindle motor 13 and clamped by a clamp spring 15 screwed to an upper end of the hub so that the magnetic disk 12 is fixed to the hub. The magnetic disk 12 is rotated and driven by the spindle motor 13 used as a drive motor in a direction indicated by an arrow B at a predetermined speed.

The head actuator 14 includes a bearing portion 21 fixed on the bottom wall of the base 10a and a plurality of arms 27 which extend from the bearing portion 21. These arms 27 are positioned in parallel to the surface of the magnetic disk 12, at predetermined intervals, and extend in the same direction from the bearing portion 21. The head actuator 14 includes elastically deformable suspensions 30 each having a shape of long plate. Each suspension 30 is formed by a plate spring, with its proximal end fixed to a distal end of the arm 27 by spot welding or adhesion, and extends from the arm. The respective suspensions 30 may be integrally formed with the respectively corresponding arms 27. The magnetic heads 33 are supported at the extending ends of the suspensions 30. The suspensions 30 and the magnetic heads 33 mounted on the arms are positioned facing the magnetic disks 12 interposed therebetween.

Each magnetic head 33 is electrically connected to a main flexible printed circuit (hereinafter, referred to as a main FPC) 38 described later through a relay flexible printed circuit board (hereinafter, referred to as a relay FPC) 35 fixed to the suspension 30 and the arm 27.

As illustrated in FIG. 2, each magnetic head 33 includes a substantially cuboid shaped slider 42 and a head portion 44 for recording and reading, which is provided at the outflow end (trailing end) of this slider. The magnetic head 33 is fixed to a gimbal spring 41 provided at a distal end portion of the suspension 30. To each magnetic head 33, a head load L directing toward the surface of the magnetic disk 12 is applied due to the elasticity of the suspension 30.

As illustrated in FIG. 1, the board unit 17 includes an FPC main body 36 formed of a flexible printed circuit board and the main FPC 38 which extends from this FPC main body. The FPC main body 36 is fixed to the bottom surface of the base 10a. Electric components are mounted on the FPC main body 36. The extending end of the main FPC 38 is connected to the head actuator 14 and further connected to the magnetic head 33 through each relay FPC 35.

The VCM 16 includes a supporting frame, not illustrated, which extends from the bearing portion 21 in a direction opposite to the arms 27 and a voice coil which is supported by the supporting frame. In configurations in which the head actuator 14 is built in the base 10a, the voice coil is positioned between a pair of yokes 34 fixed on the base 10a, and forms the VCM 16 together with these yokes and magnets fixed to the yokes.

By energizing the voice coil of the VCM 16 in a state where the magnetic disk 12 is rotating, the head actuator 14 is rotated and the magnetic head 33 is moved to and positioned above a desired track of the magnetic disk 12. In these circumstances, the magnetic head 33 is moved along the radial direction of the magnetic disk 12 between an inner peripheral portion and an outer peripheral portion of the magnetic disk.

Figure 3:
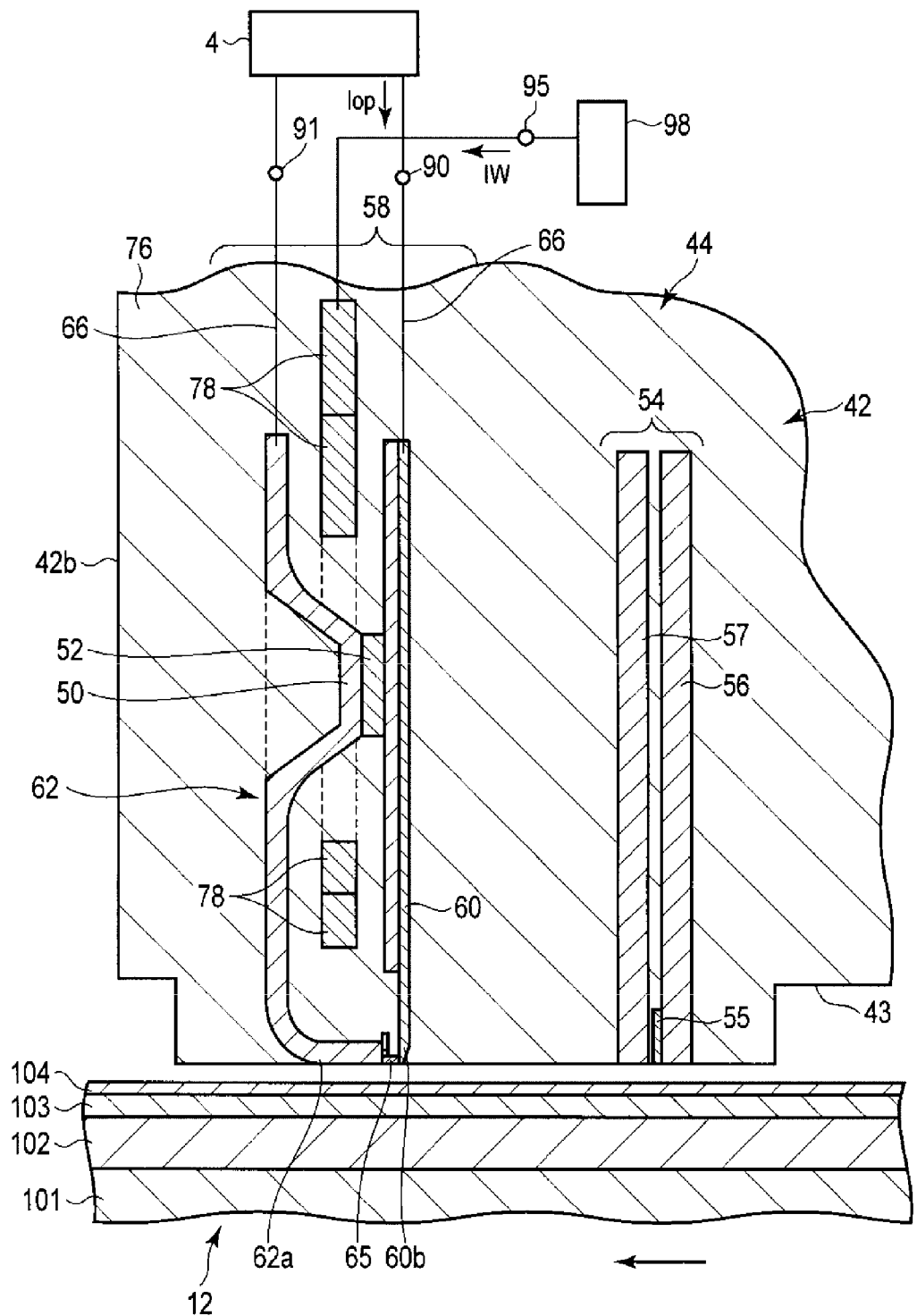
FIG. 3 is an enlarged cross-sectional view illustrating the head portion of the magnetic head.

Next, the structure of the magnetic disk 12 and the magnetic head 33 will be described in detail. FIG. 3 is an enlarged cross-sectional view of the head portion 44 of the magnetic head 33 and the magnetic disk.

As illustrated in FIGS. 1 to 3, the magnetic disk 12 includes a substrate 101 which is formed in a disk shape, for example, with a diameter of about 2.5 inches (6.35 cm) and made of a non-magnetic body. On each surface of the substrate 101, there are laminated a soft magnetic layer 102 made of a material presenting soft magnetic characteristics as an underlayer, a magnetic recording layer 103 having a magnetic anisotropy in a perpendicular direction to a disk surface above the layer, and further a protective film layer 104 above the layer in this order.

As illustrated in FIGS. 2 and 3, the magnetic head 33 is formed as a floating type head, including a slider 42 formed in a substantially cuboid shape and a head portion 44 formed at an end of the slider on an outflow end (trailing) side. The slider 42 is formed of, for example, a sintered body of alumina and titanium carbide (ALTIC), and the head portion 44 is formed by laminating thin films.

The slider 42 has a rectangular disk facing surface (air bearing surface (ABS)) 43 that faces the surface of the magnetic disk 12. The slider 42 floats due to an air flow C generated between the disk surface and the ABS 43 by the rotation of the magnetic disk 12. The direction of the air flow C corresponds to the rotational direction B of the magnetic disk 12. With respect to the surface of the magnetic disk 12, the slider 42 is arranged so that the longitudinal direction of the ABS 43 substantially agrees with the direction of the air flow C.

The slider 42 includes a leading end 42a positioned on an inflow side of the air flow C and a trailing end 42b positioned on an outflow side of the air flow C. On the ABS 43 of the slider 42, a leading step, a trailing step, a side step, and a negative-pressure cavity, not illustrated, are formed.

As illustrated in FIG. 3, the head portion 44, including a reading head 54 and a recording head (magnetic recording head) 58 formed at the trailing end 42b of the slider 42 in a thin film process, is formed as a separate typed magnetic head. The reading head 54 and the recording head 58 are covered with a protective insulating film 76, except for the portion exposed on the ABS 43 of the slider 42. The protective insulating film 76 forms the outer shape of the head portion 44.

The reading head 54 is formed with a magnetic film 55 including a magneto-resistive effect and shield films 56 and 57 which are arranged on the trailing side and the leading side of the magnetic film so as to sandwich the magnetic film 55. The lower ends of the magnetic film 55 and the shield films 56 and 57 are exposed on the ABS 43 of the slider 42.

Figure 4:
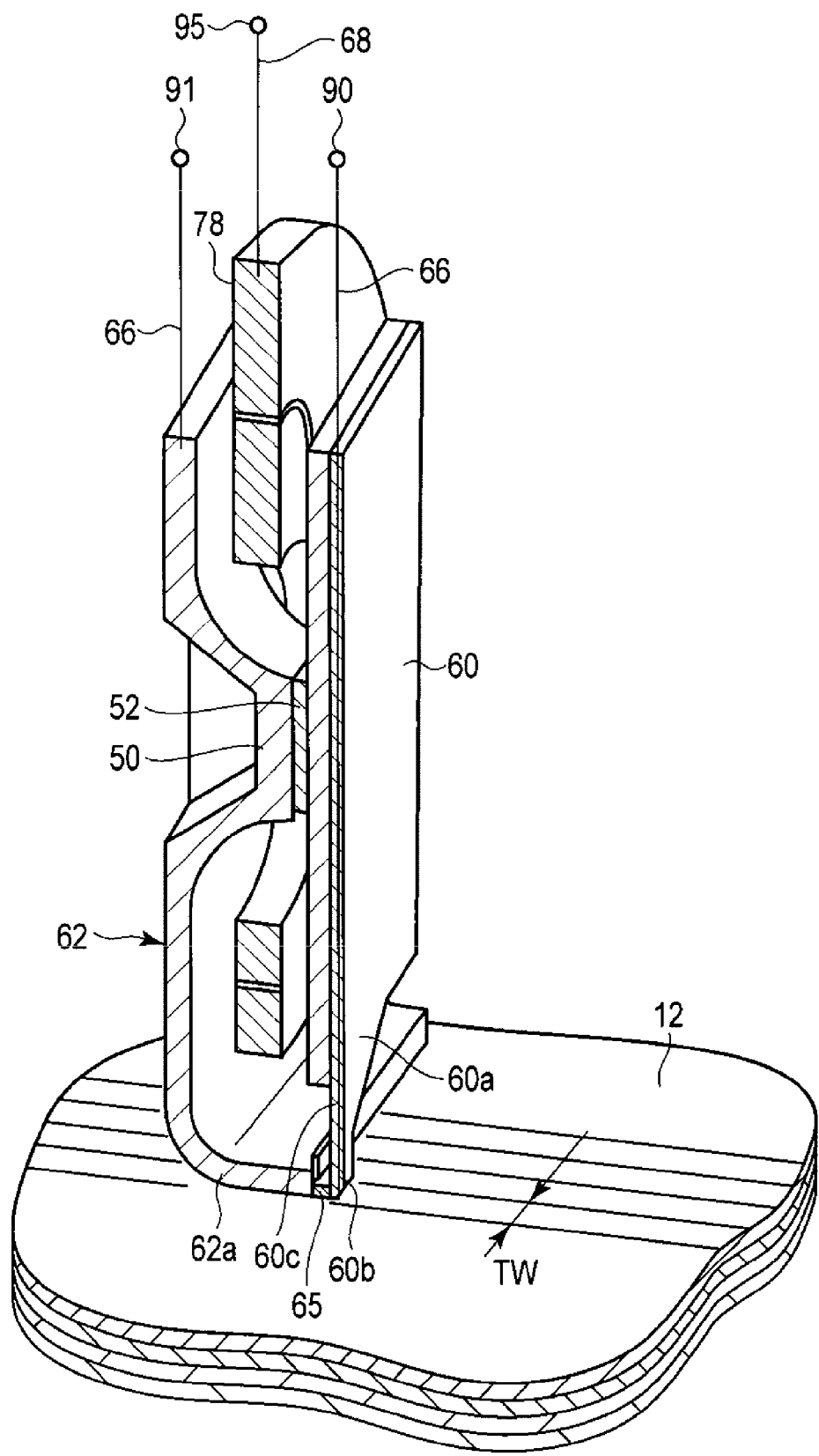
FIG. 4 is a perspective view schematically illustrating the recording head of the magnetic head.

The recording head 58 is located nearer to the side of the trailing end 42b of the slider 42 than the reading head 54. FIG. 4 is a perspective view schematically illustrating the recording head 58 and the magnetic disk 12, and FIG. 5 is an enlarged cross-sectional view illustrating an end portion of the recording head 58 on the magnetic disk side.

Figure 5:
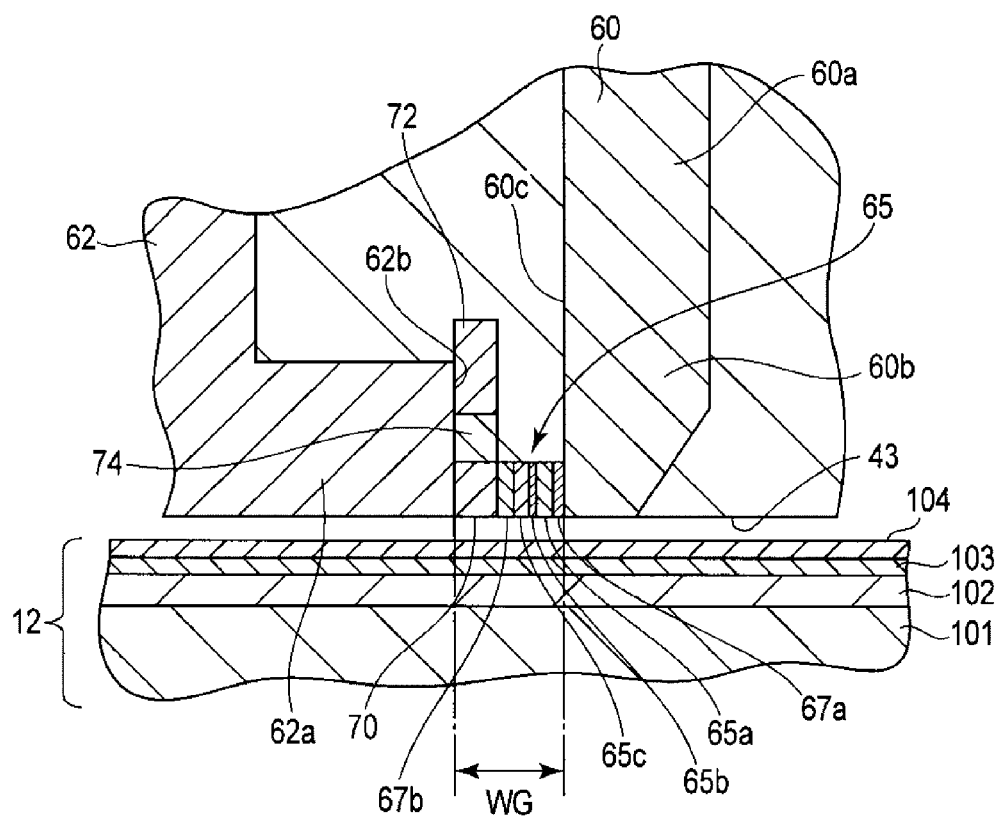
FIG. 5 is an enlarged cross-sectional view illustrating a disk-side end portion of the recording head.

As illustrated in FIGS. 3 to 5, the recording head 58 includes: a main magnetic pole 60 which is made of a high saturation magnetic material to generate a recording magnetic field in a perpendicular direction to the surface of the magnetic disk 12; a trailing shield (write shield) 62 which is made of a soft magnetic material and provided on the trailing side of the main magnetic pole 60 in order to efficiently form a magnetic path through the soft magnetic layer 102 just below the main magnetic pole 60; a recording coil 78 which is wound on the magnetic core (magnetic circuit) that includes the main magnetic pole 60 and the trailing shield 62 in order to pass magnetic flux to the main magnetic pole 60 when writing a signal onto the magnetic disk 12; and a high frequency oscillator, for example, a spin torque oscillator 65 which is made of a non-magnetic conductor and provided between the distal end portion 60b of the main magnetic pole 60 on the ABS 43 side and the trailing shield 62 and at the portion facing the ABS 43.

Figure 6:
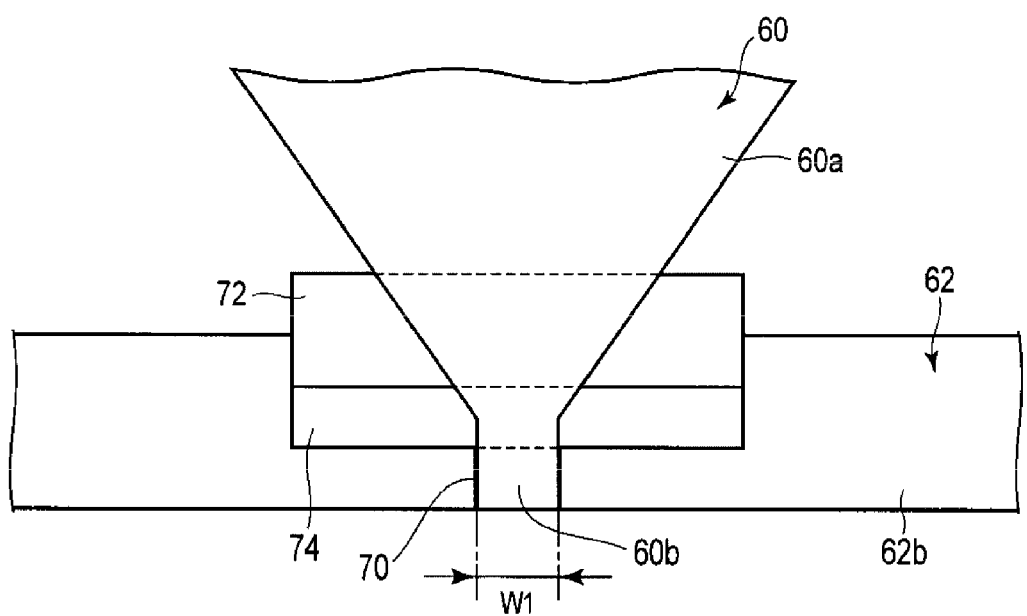
FIG. 6 is a front view illustrating a tapering distal end portion of the main magnetic pole of the recording head and a trailing shield, viewed from the main magnetic pole side.

FIG. 6 is a front view illustrating a tapering distal end portion and a magnetic portion of the main magnetic pole of the recording head.

As illustrated in FIGS. 3 to 6, the main magnetic pole 60 formed of a soft magnetic material extends substantially in a direction perpendicular to the surface of the magnetic disk 12 and the ABS 43. The lower end of the main magnetic pole 60 on the ABS 43 side includes a tapering portion 60a which is tapered toward the magnetic disk 12 and narrowed in a track width direction, such as a funnel shape, and the distal end portion 60b having a predetermined width extending from the tapering portion 60a to the magnetic disk side. A tip or the lower end of the distal end portion 60b is exposed on the ABS 43 of the magnetic head. The width W1 of the distal end portion 60b in the track width direction almost corresponds to the width TW of a track in the magnetic disk 12. Further, the main magnetic pole 60 has a shield side end surface 60c that extends substantially perpendicular to the ABS 43 and is disposed on the trailing side of main magnetic pole 60.

The trailing shield 62 formed of a soft magnetic material is arranged on the trailing side of the main magnetic pole 60, in order to efficiently close a magnetic path through the soft magnetic layer 102 just below the main magnetic pole 60. The trailing shield 62, which is formed in a substantially L-shape, includes a distal end portion 62a facing the lower end of the main magnetic pole 60 and a connecting portion 50 connected to the main magnetic pole 60 that is separated from the ABS 43. The connecting portion 50 is connected to the upper portion of the main magnetic pole 60, or the upper portion is separated from the ABS 43 through a non-conductive body 52.

The distal end portion 62a of the trailing shield 62 is formed in a long rectangle shape. The lower end surface of the trailing shield 62 is exposed on the ABS 43 of the slider 42. The leading side end surface 62b of the distal end portion 62a extends substantially perpendicular to the ABS 43 or at an acute angle, in a track width direction of the magnetic disk 12. The leading side end surface (end surface on the side of the main magnetic pole 60) 62b faces the shield side end surface 60c of the main magnetic pole 60 at the lower end portion of the main magnetic pole 60 (a part of the distal end portion 60b and the tapering portion 60a) and is substantially parallel with a write gap WG disposed therebetween.

As illustrated in FIGS. 5 and 6, in the embodiment, the trailing shield 62 includes a first protrusion 70 and a second protrusion 72 protruding from the leading side end surface 62b toward the main magnetic pole 60. The first protrusion 70 and the second protrusion 72 are formed of a soft magnetic material integrally formed with the trailing shield 62 or in contact with the trailing shield 62.

The first protrusion 70 protrudes from the leading side end surface 62b of the trailing shield 62 (which is on the ABS 43 side of trailing shield 62) and faces the distal end portion 60b of the main magnetic pole 60 with a space interposed therebetween. Further, the first protrusion 70 is formed in, for example, a rectangle shape and the lower end surface thereof is exposed on the ABS 43, at the same surface level with the lower end surface of the trailing shield 62, thereby forming a planar ABS 43. The first protrusion 70 is formed with substantially the same width as the width W1 of the distal end portion 60b of the main magnetic pole 60 in a track width direction and the width of the spin torque oscillator 65 (described later) in a track width direction. Further, the first protrusion 70 is formed with substantially the same height (i.e., dimension perpendicular to ABS 43) as the height (dimension perpendicular to ABS 43) of the spin torque oscillator 65.

The spin torque oscillator 65 is disposed between the distal end portion 60b of the main magnetic pole 60 and the first protrusion 70, within the above-described write gap WG. The spin torque oscillator 65 includes an underlayer, a spin injection layer 65a, an interlayer 65b, and an oscillation layer 65c, and these layers are stacked in this order from the side of the main magnetic pole 60 to the side of the trailing shield 62. The spin injection layer 65a is joined to the shield side end surface 60c of the main magnetic pole 60 through a non-magnetic conductor layer (underlayer) 67a. The oscillation layer 65c is joined to the first protrusion 70 of the trailing shield 62 through a non-magnetic conductor layer (gap layer) 67b.

Each of the spin injection layer 65a, the interlayer 65b, and the oscillation layer 65c has a stacked surface or a film surface extending in a direction crossing the plane of the ABS 43, for example, orthogonal to the ABS 43. Thus, oscillation layer 65c may extend in a plane substantially perpendicular to the recording layer 103 of the magnetic disk 12. The lower end surface of the spin torque oscillator 65 is exposed on the ABS 43 at the same surface level with the ABS 43. The width (dimension into the page in FIG. 5) and the height (dimension perpendicular to the plane of the ABS 43) of the spin torque oscillator 65 are substantially equal to the width and the height of the first protrusion 70.

As illustrated in FIGS. 5 and 6, the second protrusion 72 is positioned separate from (i.e., not in contact with) the first protrusion 70 and from the spin torque oscillator 65. Here, the second protrusion 72 is disposed separate from and on an opposite side of the first protrusion 70 from the ABS 43. The second protrusion 72 is formed in, for example, a rectangle shape and faces the tapering portion 60a of the main magnetic pole 60 with a space interposed therebetween. The second protrusion 72 has a width that extends in a track width direction (i.e., substantially parallel to the surface of magnetic disk 12 and perpendicular to rotational direction B), where the width of the second protrusion is greater than the width of the first protrusion 70 extending in the track width direction. Furthermore, the width of the second protrusion 72 is greater than a width of the tapering portion 60a that extends in the track width direction, as shown in FIG. 6. At least a part of the second protrusion 72 overlaps the leading side end surface 62b of the trailing shield 62. Here, the lower half portion of the second protrusion 72 overlaps and contacts the leading side end surface 62b and the upper half portion thereof protrudes upwardly from the trailing shield 62 in a direction substantially perpendicular to the surface of magnetic disk 12. Further, in the embodiment illustrated in FIGS. 5 and 6, the second protrusion 72 is not positioned directly above the oscillation layer 65c of the spin torque oscillator 65, so that the oscillation layer 65c is disposed between the second protrusion 72 and the ABS 43. Instead, the oscillation layer 65c is disposed further away from the side of the trailing shield 62 than the second protrusion 72 is. The second protrusion 72 forms a magnetic element made of a soft magnetic material and makes a dividing magnetic path passing through the main magnetic pole 60, the second protrusion 72, and the trailing shield 62.

As illustrated in FIGS. 5 and 6, a non-magnetic portion 74 made of, for example, $SiO_2$, is disposed between the first protrusion 70 and the second protrusion 72, and is in contact with the leading side end surface 62b of the trailing shield 62 and with the first and second protrusions 70 and 72. The non-magnetic portion 74 is formed with the substantially same thickness as the distance the first and second protrusions 70 and 72 respectively protrude from the leading side end surface 62b along a direction parallel to the surface of magnetic disk 12; however, the non-magnetic portion 74 is not limited to this; in some embodiments the non-magnetic portion 74 may extend from the leading side end surface 62b of the trailing shield 62 to as far as the shield side end surface 60c of the main magnetic pole 60.

As illustrated in FIGS. 3 and 4, the main magnetic pole 60 and the trailing shield 62 are connected to a power source 94 through a wiring 66 and connection terminals 90 and 91, to form a current circuit so that a current Iop may flow from the power source 94 through the wiring 66, the main magnetic pole 60, the spin torque oscillator 65, and the trailing shield 62 in series.

The recording coil 78 is wound on the connecting portion 50, for example, between the main magnetic pole 60 and the trailing shield 62. The recording coil 78 is connected to a terminal 95 through a wiring 68 and a second power source 98 is connected to the terminal 95. A recording current Iw to be provided from the second power source 98 to the recording coil 78 is controlled by a control unit of the HDD. When writing a signal into the magnetic disk 12, a predetermined recording current Iw is supplied from the second power source 98 to the recording coil 78, to thereby pass magnetic flux to the main magnetic pole 60 and generate a magnetic field.

According to the HDD thus described, the VCM 16 is driven, to rotate the head actuator 14, and the magnetic head 33 is moved to the magnetic disk 12 above a desired track and positioned there. The magnetic head 33 floats due to an air flow C generated between the disk surface and the disk facing surface 43 by the rotation of the magnetic disk 12. During the operation of the HDD, the ABS 43 of the slider 42 is kept facing the disk surface, with a space maintained between magnetic disk 12 and ABS 43. As illustrated in FIG. 2, the magnetic head 33 floats at such a slant that a portion at the recording head 58 of the head portion 44 most closely approaches the surface of the magnetic disk 12. In this state, recorded information is read from the magnetic disk 12 by the reading head 54 and information is written in the magnetic disk 12 by the recording head 58.

While writing information, as illustrated in FIGS. 3 and 5, a direct current is supplied from the power source 94 to the main magnetic pole 60, the spin torque oscillator 65, and the trailing shield 62, a high frequency magnetic field is generated from the spin torque oscillator 65, and the high frequency magnetic field is applied to the magnetic recording layer 103 of the magnetic disk 12. Further, an alternating current is supplied from the power source 98 to the recording coil 78, to excite the main magnetic pole 60 by the recording coil 78 and to apply a recording magnetic field in a direction perpendicular to the recording layer 103 of the magnetic disk 12 directly below the main magnetic pole 60. Accordingly, information is recorded in the magnetic recording layer 103 with a desired track width. A high frequency magnetic field is superimposed on a recording magnetic field, which enables the magnetic recording in a material having high coercive force and high magnetic anisotropic energy. A current flows from the main magnetic pole 60 to the trailing shield 62, to resolve a disturbance of the magnetic domain within the main magnetic pole 60 and introduce an efficient magnetic path; as a result, a magnetic field generated from the distal end of the main magnetic pole 60 is increased in strength.

Further, a part of the magnetic field within the write gap is perpendicularly applied to the film surface of the spin torque oscillator 65, between the main magnetic pole 60 and the trailing shield 62: specifically, along the magnetic path passing through the main magnetic pole 60, the spin torque oscillator 65, the first protrusion 70, and the trailing shield 62. A part of the remaining magnetic field within the write gap is concentrated along the divergent magnetic path passing through the main magnetic pole 60, the second protrusion (magnetic portion) 72, and the trailing shield 62. In other words, a part of the magnetic field within the write gap is not applied to the spin torque oscillator 65 but is applied along the divergent magnetic path that is separated from the spin torque oscillator 65. Consequently, without significantly reducing the intensity of the magnetic field applied from the write gap portion of the magnetic core including the main magnetic pole 60 and the trailing shield 62 to the magnetic disk 12, a magnetic field within the write gap that is applied to the spin torque oscillator 65 may be reduced. Accordingly, even when a magnetic field applied from the write gap WG of the magnetic core to the magnetic disk 12 is strong, it is possible to reduce the intensity of a magnetic field that is within the write gap and is applied to the spin torque oscillator 65, thereby improving the oscillation of the spin torque oscillator 65. According to this, as compared to the conventional recording head, a magnetic recording head and a magnetic disk device have improved error rate and are capable of high density recording.

Figure 7:
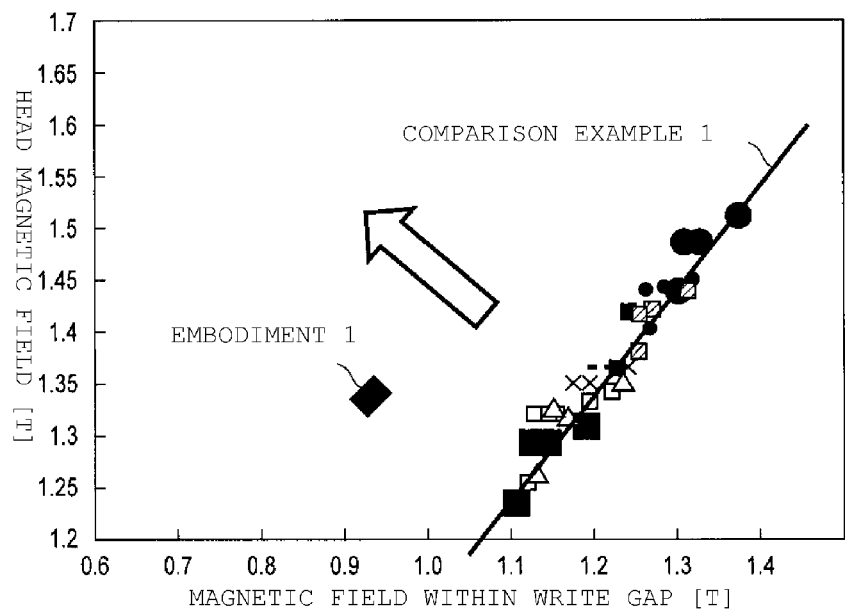
FIG. 7 is a view comparatively illustrating a relationship between a magnetic field within a write gap and a head magnetic field, obtained from a recording head of the HDD according to the first embodiment and a recording head according to a comparative example.
Figure 8:
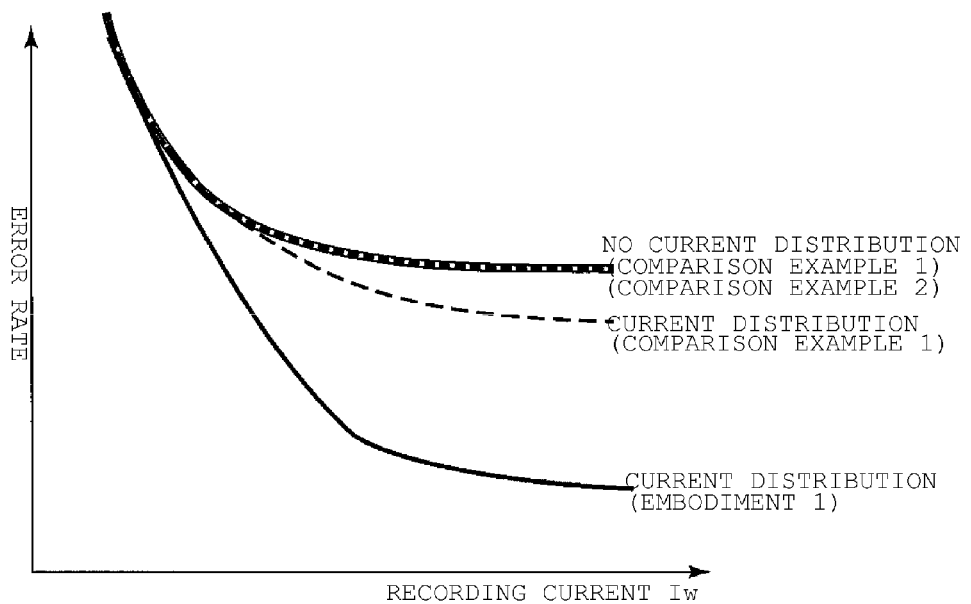
FIG. 8 is a view comparatively illustrating a relationship between a recording current and an error rate, obtained from the recording head of the HDD according to the first embodiment and the recording head according to the comparative example.

FIGS. 7 and 8 illustrate the effects of the magnetic recording head according to the embodiment in comparison with a magnetic recording head according to a comparison example 1. A magnetic recording head according to the comparison example 1 is a recording head that is not provided with the second protrusion forming a magnetic portion but is provided with a high frequency oscillator between the main magnetic pole 60 and the write shield. FIG. 7 illustrates a relationship between a magnetic field within the write gap perpendicularly applied to the film surface of the spin torque oscillator and a head magnetic field intensity applied from the distal end portion of the main magnetic pole 60 to the perpendicular recording layer of the magnetic disk 12.

As illustrated in FIG. 7, in the magnetic recording head according to the comparison example, the magnetic field within the write gap varies in proportion to the head magnetic field. In other words, the magnetic field within the write gap applied to the high frequency oscillator increases according to an increase in the head magnetic field.

In order to apply a microwave to the recording layer of the recording medium, it is necessary to place the high frequency oscillator 65 in a favorable oscillation state. For this purpose, it is generally preferred that the magnetic field within the write gap is 1 (T) (Tesla) or less. In the magnetic recording head of the comparison example 1, in order to make the magnetic field within the write gap no more than 1 (T), the head magnetic field before supplying power to the high frequency oscillator is dropped to 1.2 (T) or less; as a result, the original recording state deteriorates and an increased level of a recording ability due to the microwave effect is low.

On the contrary, the magnetic recording head according to the embodiment may reduce the magnetic field within the write gap to 1 (T) or less, while keeping the head magnetic field intensity at 1.3 (T) or more; therefore, it is possible to cause the high frequency oscillator to oscillate favorably and achieve a recording ability better than that of the magnetic recording head according to the comparison example 1.

FIG. 8 illustrates a relationship between a recording current Iw and an error rate. In FIG. 8, a magnetic recording head according to a comparison example 2 is a magnetic recording head that is not provided with a high frequency oscillator. In FIG. 8, a vertical axis illustrates an error rate; a decreased error rate is an improved error rate.

In the magnetic recording head according to the above mentioned comparison example 1, the error rate corresponding to power distribution to the high frequency oscillator is more improved than the error rate corresponding to no power distribution to the high frequency oscillator; however, such improvement is small. In other words, in the magnetic recording head of the comparison example 1, although the error rate is improved thanks to the microwave generation from the high frequency oscillator, the recording density is only slightly improved.

The error rate of the magnetic recording head (without high frequency oscillator) according to the comparison example 2 is substantially the same as the error rate of the magnetic recording head in the comparison example 1 in the state without power distribution to the high frequency oscillator.

On the contrary, in the magnetic recording head according to the embodiment, the high frequency oscillator oscillates favorably and the error rate thereof is more improved than the error rate of the magnetic recording heads of comparison examples 1 and 2. Thus, according to some embodiments, recording density may be improved.

As mentioned above, according to the embodiment, the magnetic field within the write gap may be optimized so as to give a spin torque oscillator (high frequency assist element) a favorable magnetization oscillation; the recording layer of the recording medium is in a favorable magnetization reversal state, and it is possible for a magnetic recording head and an HDD to have improved error rate and be capable of high density recording.

Next, a magnetic recording head of an HDD according to other embodiments will be described. In the other embodiments described below, the same reference numerals are attached to the same portions as those of the above mentioned first embodiment, and the description thereof is omitted. Thus, only the portions that differ from the first embodiment will be specifically described.

Second Embodiment

Figure 9:
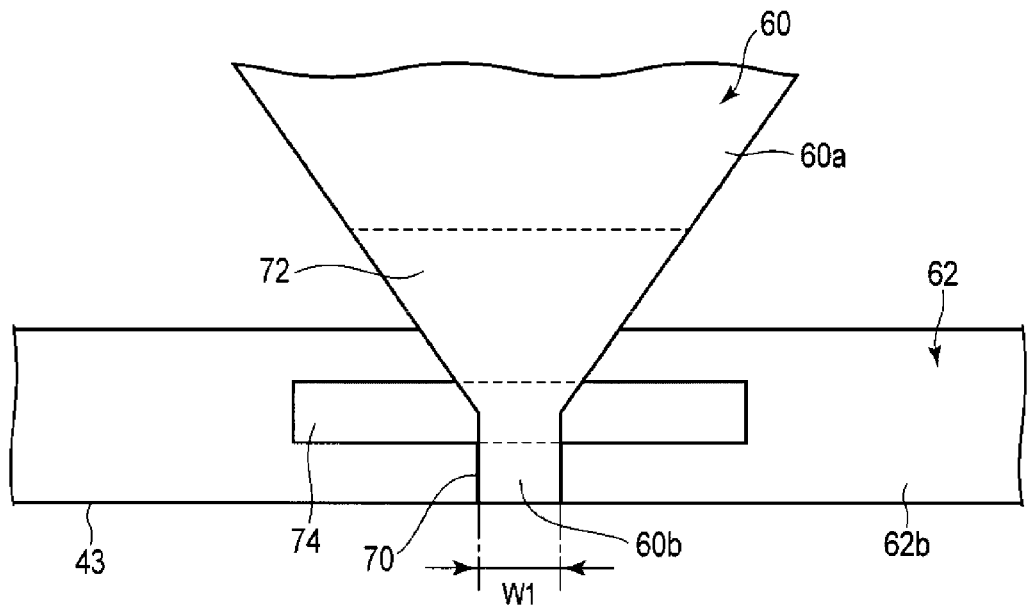
FIG. 9 is a perspective view illustrating a main magnetic pole distal end portion of a recording head in an HDD according to a second embodiment.

FIG. 9 is a front view of a distal end portion of a magnetic recording head in an HDD according to a second embodiment, viewed from the side of the main magnetic pole 60. According to the embodiment, a second protrusion 72 forming a magnetic portion is formed in a trapezoidal shape with the shape in a track width direction that conforms to the shape of the tapering portion 60a of the main magnetic pole 60. The lower end of the second protrusion 72 on the ABS 43 side is in contact with the leading side end surface 62b of the trailing shield 62. Even when the magnetic portion having such a shape is used, a high frequency oscillator may be in a good oscillation state and an error rate may be improved.

Third Embodiment

Figure 10:
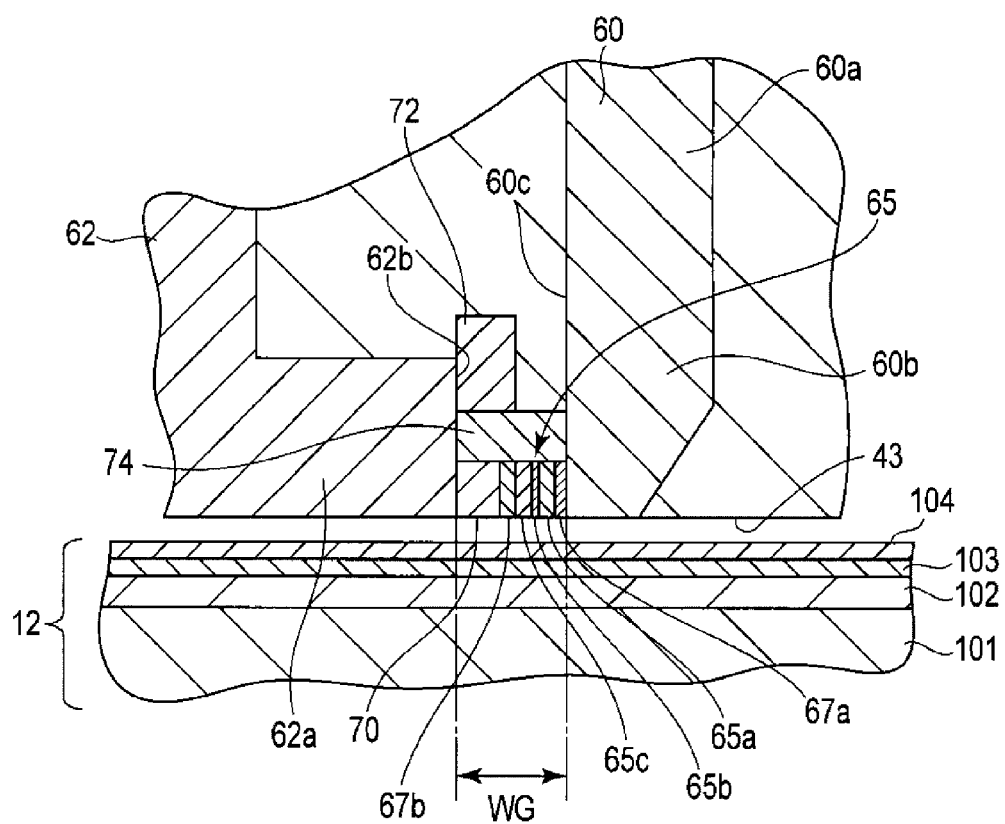
FIG. 10 is an enlarged cross-sectional view illustrating a disk-side end portion of a recording head in an HDD according to a third embodiment.

FIG. 10 is a cross-sectional view, taken along a track center, illustrating a distal end portion of a magnetic recording head in an HDD according to a third embodiment. According to the embodiment, a second protrusion 72 forming a magnetic portion is formed to protrude more toward the main magnetic pole 60 than the first protrusion 70 extends toward the main magnetic pole 60. Here, the main magnetic pole 60 side of the protruding end of the second protrusion 72 is not positioned in alignment with the oscillation layer 65c of the spin torque oscillator 65. Instead, second protrusion 72 is positioned between a plane in which oscillation layer 65c is disposed (which may be substantially perpendicular to the recording layer of the recording medium) and the leading side end surface 62b.

According to the magnetic recording head configuration described above, it is possible to further reduce the magnetic field within the write gap applied to the spin torque oscillator 65; therefore, the spin torque oscillator 65 oscillates more easily, and the error rate may be further improved.

Fourth Embodiment

Figure 11:
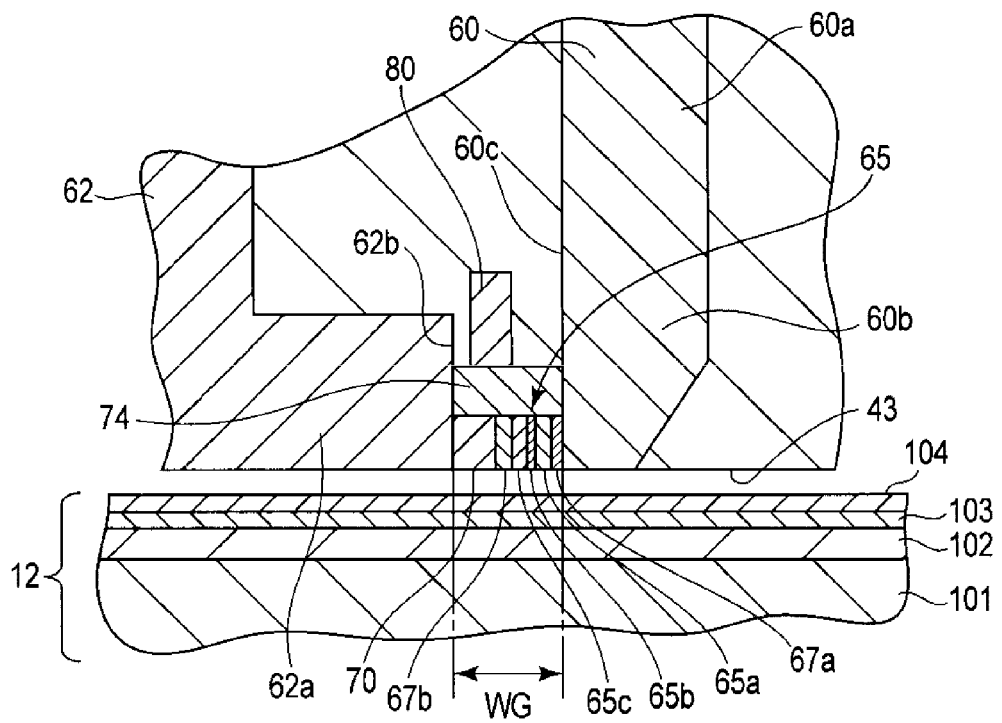
FIG. 11 is an enlarged cross-sectional view illustrating a disk-side end portion of a recording head in an HDD according to a fourth embodiment.

FIG. 11 is a cross-sectional view, taken along a track center, illustrating a distal end portion of a magnetic recording head in an HDD according to a fourth embodiment. According to the embodiment, a magnetic element 80 made of a soft magnetic material is arranged between the main magnetic pole 60 and the trailing shield 62 and faces the shield side end surface 60c of the main magnetic pole 60 and the leading side end surface 62b of the trailing shield 62 respectively. In addition, the magnetic element 80 faces but is not in contact with the main magnetic pole 60 and faces but does not contact the trailing shield 62. In short, the magnetic element 80 is not in contact with the main magnetic pole 60 and the trailing shield 62. At least the lower end of the magnetic element 80 on the ABS 43 side is positioned within the write gap WG. Further, in the embodiment, the main magnetic pole 60 side of the magnetic element 80 is not positioned in alignment with the oscillation layer 65c of the spin torque oscillator 65. Instead, the magnetic element 80 is positioned between a plane in which oscillation layer 65c is disposed and the leading side end surface 62b. Alternatively, the magnetic element 80 may be positioned between a plane in which oscillation layer 65c is disposed and the shield side end surface 60c, so that the trailing shield 62 side of magnetic element 80 is not aligned with the oscillation layer 65c of the spin torque oscillator 65. A non-magnetic portion 74 is disposed between the magnetic element 80 and the first protrusion 70 and spin torque oscillator 65.

Also in the magnetic recording head thus constituted, a part of the magnetic field within the write gap is applied along a divergent magnetic path passing through the main magnetic pole 60, the magnetic element 80, and the trailing shield 62, thereby reducing the magnetic field within the write gap applied to the spin torque oscillator 65. According to this embodiment, the spin torque oscillator 65 oscillates more easily, facilitating a stable high frequency assist; as a result, an error rate may be improved and a high density recording may be achieved for an HDD.

Fifth Embodiment

Figure 12:
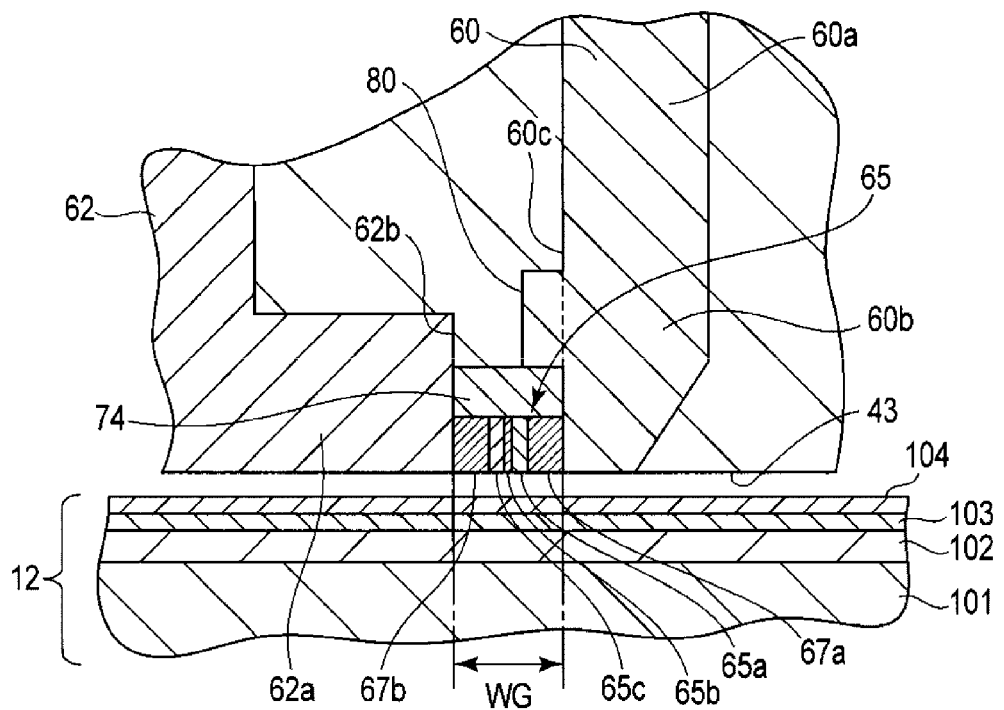
FIG. 12 is an enlarged cross-sectional view illustrating a disk-side end portion of a recording head in an HDD according to a fifth embodiment.

FIG. 12 is a cross-sectional view, taken along a track center, illustrating a distal end portion of a magnetic recording head in an HDD according to a fifth embodiment. According to the embodiment, a magnetic element 80 formed of a soft magnetic material is arranged in contact with the main magnetic pole 60. Here, the magnetic element 80 is formed integrally with the main magnetic pole 60 as a protrusion protruding from the shield side end surface 60*c* of the main magnetic pole 60 to the trailing shield 62 side. The lower end of the magnetic element 80 on the ABS 43 side is positioned within the write gap WG. The magnetic element 80 faces the leading side end surface 62*b* of the trailing shield 62 with a space. Further, the magnetic element 80 is positioned deviated from the position right above the oscillation layer 65*c* of the spin torque oscillator 65 to the main magnetic pole 60 side. A non-magnetic portion 74 is disposed between the magnetic element 80 and the spin torque oscillator 65.

The first protrusion of the trailing shield 62 illustrated in the first to fifth embodiments may be omitted. According to this embodiment, the trailing shield 62 does not include the first protrusion and the second protrusion. In addition, the spin torque oscillator 65 is connected to the leading side end surface 62*b* of the trailing shield 62 through a non-magnetic conductive layer 67*b*.

Also in this embodiment of magnetic recording head, a part of the magnetic field within the write gap is applied along a dividing magnetic path passing the main magnetic pole 60, the magnetic element 80, and the trailing shield 62, thereby reducing the magnetic field within the write gap applied to the spin torque oscillator 65. Consequently, the spin torque oscillator 65 oscillates more easily, facilitating a stable high frequency assist; therefore, an error rate may be improved, and a high density recording may be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, material, shape, size and the like of elements which constitute the head portion may be changed when necessary. In the magnetic disk device, the number of magnetic disks and the number of magnetic heads may be increased when necessary, and a size of the magnetic disk may be variously selected.

What is claimed is:

1. A magnetic recording head, comprising:
   a main magnetic pole configured to generate a recording magnetic field in a direction perpendicular to a recording layer of a recording medium;
   a write shield with a surface that faces a trailing side of the main magnetic pole at a recording medium end of the main magnetic pole, so that a write gap is interposed between the surface and the main magnetic pole, the write shield forming a magnetic core together with the main magnetic pole;
   a recording coil that is wound on the magnetic core;
   a high frequency oscillator disposed between the main magnetic pole and the write shield within the write gap;
   a wiring through which a current can flow through the main magnetic pole, the high frequency oscillator, and the write shield in series; and
   a magnetic element that is made of a soft magnetic material, is positioned within the write gap and separated from the high frequency oscillator, and is configured to form a magnetic path that passes through the main magnetic pole, the magnetic element, and the write shield, but not through the high frequency oscillator,
   wherein the write shield includes:
      a first protrusion that protrudes from the surface toward the main magnetic pole and is separated from the magnetic element, and
      a second protrusion that protrudes from the surface toward the main magnetic pole and is separated from the first protrusion to form the magnetic element,
      wherein the high frequency oscillator is disposed between the first protrusion and the main magnetic pole, and
      a nonmagnetic element is disposed between the first protrusion and the second protrusion.

2. The magnetic recording head according to claim 1, wherein
   the main magnetic pole includes a shield side end surface facing the write shield, and
   the magnetic element is arranged to be in contact with the shield side end surface of the main magnetic pole.

3. The magnetic recording head according to claim 1, wherein
   the magnetic element faces but is not in contact with the main magnetic pole and faces but does not contact the write shield.

4. The magnetic recording head according to claim 1, wherein
   a width of the second protrusion in a track width direction of the recording medium is larger than a width of the first protrusion in the track width direction.

5. The magnetic recording head according to claim 1, wherein
   the main magnetic pole includes a tapering portion that narrows toward the recording medium, and
   the magnetic element is formed in a tapering shape that substantially corresponds to the tapering portion and faces the tapering portion.

6. The magnetic recording head according to claim 1, wherein the high frequency oscillator is in contact with the main magnetic pole and the write shield.

7. A disk device comprising:
   a recording medium including a recording layer with a magnetic anisotropy in a direction perpendicular to the medium surface;
   a driving unit configured to rotate the recording medium; and
   a magnetic recording head comprising:
      a main magnetic pole configured to generate a recording magnetic field in a direction perpendicular to the recording layer;
      a write shield with a surface that faces a recording medium end of the main magnetic pole, so that a write gap is interposed between the surface and the main magnetic pole, the write shield forming a magnetic core together with the main magnetic pole;
      a recording coil that is wound on the magnetic core;
      a high frequency oscillator disposed between the main magnetic pole and the write shield within the write gap;
      a wiring through which a current can flow through the main magnetic pole, the high frequency oscillator, and the write shield in series; and
      a magnetic element that is made of a soft magnetic material, is positioned within the write gap and separated from the high frequency oscillator, and is configured to form a magnetic path that passes through the main magnetic pole, the magnetic element, and the write shield, and not through the high frequency oscillator, wherein the main magnetic pole includes a shield side end surface facing the write shield, and wherein the magnetic element is arranged to be in contact with the shield side end surface of the main magnetic pole.

8. The disk device according to claim 7, wherein the main magnetic pole includes a tapering portion that narrows toward the recording medium, and the magnetic element is formed in a tapering shape that substantially corresponds to the tapering portion and faces the tapering portion.

9. A magnetic recording head, comprising:

a main magnetic pole configured to generate a recording magnetic field in a direction perpendicular to a recording layer of a recording medium;

a write shield with a surface that faces a recording medium end of the main magnetic pole, so that a write gap is interposed between the surface and the main magnetic pole, the write shield forming a magnetic core together with the main magnetic pole;

a recording coil that is wound on the magnetic core;

a high frequency oscillator disposed between the main magnetic pole and the write shield within the write gap;

a wiring through which a current can flow through the main magnetic pole, the high frequency oscillator, and the write shield in series;

a first magnetic element that is made of a soft magnetic material and is positioned within the write gap and separated from the high frequency oscillator; and a second magnetic element that is made of a soft magnetic material, is positioned within the write gap, and is separated from the high frequency oscillator and the first magnetic element, wherein the first magnetic element is configured to form a first magnetic path that passes through the main magnetic pole, the first magnetic element, and the write shield, but not through the high frequency oscillator, and wherein the second magnetic element is configured to form a second magnetic path that passes through the main magnetic pole, the high frequency oscillator, the second magnetic element, and the write shield.

10. The magnetic recording head according to claim 9, wherein the high frequency oscillator is in contact with the main magnetic pole and the write shield.

11. A magnetic recording head, comprising:

a main magnetic pole configured to generate a recording magnetic field in a direction perpendicular to a recording layer of a recording medium;

a write shield with a surface that faces a recording medium end of the main magnetic pole, so that a write gap is interposed between the surface and the main magnetic pole, the write shield forming a magnetic core together with the main magnetic pole;

a recording coil that is wound on the magnetic core;

a high frequency oscillator disposed between the main magnetic pole and the write shield within the write gap;

a wiring through which a current can flow through the main magnetic pole, the high frequency oscillator, and the write shield in series;

a first magnetic element that is made of a soft magnetic material and is positioned within the write gap and separated from the high frequency oscillator; and a second magnetic element that is made of a soft magnetic material, is positioned within the write gap, and is separated from the high frequency oscillator and the first magnetic element, wherein at least a portion of the first magnetic element contacts the surface and at least a portion of the second magnetic element contacts the surface.

* * * * *